US011386635B2

(12) United States Patent
Wu

(10) Patent No.: US 11,386,635 B2
(45) Date of Patent: Jul. 12, 2022

(54) SMART CHIP ASSEMBLY CAPABLE OF COMMUNICATING WITH EACH OTHER AND VARIABLE ARRAY IN PACKAGING

(71) Applicant: NEURONBASIC TECHNOLOGY INC., Santa Clara, CA (US)

(72) Inventor: Raymond Wu, Santa Clara, CA (US)

(73) Assignee: Neuronbasic Technology, Inc., Santa Clara, CA (US)

( * ) Notice: Subject to any disclaimer, the term of this patent is extended or adjusted under 35 U.S.C. 154(b) by 13 days.

(21) Appl. No.: 17/060,229

(22) Filed: Oct. 1, 2020

(65) Prior Publication Data

US 2022/0067414 A1 Mar. 3, 2022

(30) Foreign Application Priority Data

Aug. 25, 2020 (TW) .................................. 109128900

(51) Int. Cl.
| | | |
|---|---|---|
| *H04N 5/225* | (2006.01) | |
| *G06V 10/147* | (2022.01) | |
| *H04N 5/232* | (2006.01) | |

(52) U.S. Cl.
CPC ......... *G06V 10/147* (2022.01); *H04N 5/2258* (2013.01); *H04N 5/23227* (2018.08)

(58) Field of Classification Search
None
See application file for complete search history.

(56) References Cited

U.S. PATENT DOCUMENTS

| | | | | |
|---|---|---|---|---|
| 2006/0243889 | A1* | 11/2006 | Farnworth | ........ H01L 27/14683 250/208.1 |
| 2011/0141337 | A1* | 6/2011 | Kuo | ....................... G03B 35/10 348/340 |
| 2013/0314582 | A1* | 11/2013 | Masser | ................ H04N 5/2256 348/340 |
| 2016/0219203 | A1* | 7/2016 | Wan | ..................... B29C 45/1671 |
| 2017/0041513 | A1* | 2/2017 | Yang | ..................... H04N 5/2253 |
| 2017/0064172 | A1* | 3/2017 | Vittu | ..................... G02B 13/001 |
| 2018/0091712 | A1* | 3/2018 | Lee | .......................... G01J 3/513 |
| 2020/0099832 | A1* | 3/2020 | Chang | ................... H04N 5/2253 |

\* cited by examiner

*Primary Examiner* — Timothy J Henn
*Assistant Examiner* — Dwight Alex C Tejano
(74) *Attorney, Agent, or Firm* — Rosenberg, Klein & Lee

(57) ABSTRACT

A smart chip assembly capable of communicating with each other and variable array in packaging contains at least two intelligent single-chip, which can be easily formed into a smart chip assembly by cutting after packaging. Each intelligent single-chip has a camera lens module, and each lens module is arranged in a different position and angle to separately obtain images of different angles or depths of field of the object to be recognized, and provide each intelligent single-chip to independently process the image and judge by itself. The result of each judgment based on the obtained images of different angles or depths of field can also be used as one of the options for reference judgment. Then through the mutual communication between the intelligent single-chips, they calculate and analyze different image and image dynamics, and make comprehensive judgments to obtain the best interpretation. Finally, the command is sent to the connected power mechanism to perform corresponding actions to achieve more flexible application and improve the accuracy of identification.

2 Claims, 3 Drawing Sheets

SMART CHIP ASSEMBLY CAPABLE OF COMMUNICATING WITH EACH OTHER AND VARIABLE ARRAY IN PACKAGING

CROSS REFERENCES TO RELATED APPLICATIONS

N/A

FIELD OF INVENTION

This invention is related to a smart chip assemblies, which includes at least two single-chips having feature extraction. Use each lens module of the single-chip to take images from multiple angles or depths of field, communicate between each intelligent single-chip, calculate and analyze, and achieve a creative design for more accurate image recognition.

BACKGROUND

In the modern era where artificial intelligence is booming, using intelligent recognition to interpret external information has become an important technology. Most applications are to obtain various information from the outside, through external connection or wireless transmission sent to a remote intelligent system for interpretation and analysis. This traditional method requires the process of external data transmission leading to the disadvantages of poor efficiency and stability. Therefore, the inventor of this application has designed a single-chip intelligent identification device (U.S. patent application Ser. No. 16/680,662), which is used in a smart single-chip body combined with a camera lens module, and can be directly assembled in various devices. That can achieve efficient real-time identification to gain the purpose of analysis and interpretation. After actual use, it does have considerable results. On this basis, in order to improve the more accurate identification effect, the inventor design a better present invention to improve recognition ability and analysis judgment, and to obtain more satisfactory recognition accuracy.

SUMMARY

The present invention relates to a smart chip assembly capable of communicating with each other and variable array in packaging. It contains at least two intelligent single-chip, which can be easily formed into a smart chip assembly by cutting after packaging. Each intelligent single-chip has a camera lens module, and each lens module is arranged in a different position and angle to separately obtain images of different angles or depths of field of the object to be recognized, and provide each intelligent single-chip to independently process the image and judge by itself. The result of each judgment based on the obtained images of different angles or depths of field can also be used as one of the options for reference judgment. Then through the mutual communication between the intelligent single-chips, they calculate and analyze different image and image dynamics, and make comprehensive judgments to obtain the best interpretation. Finally, the command is sent to the connected power mechanism to perform corresponding actions to achieve more flexible application and improve the accuracy of identification.

DETAILED DESCRIPTION AND PREFERRED EMBODIMENT

Figure 1:
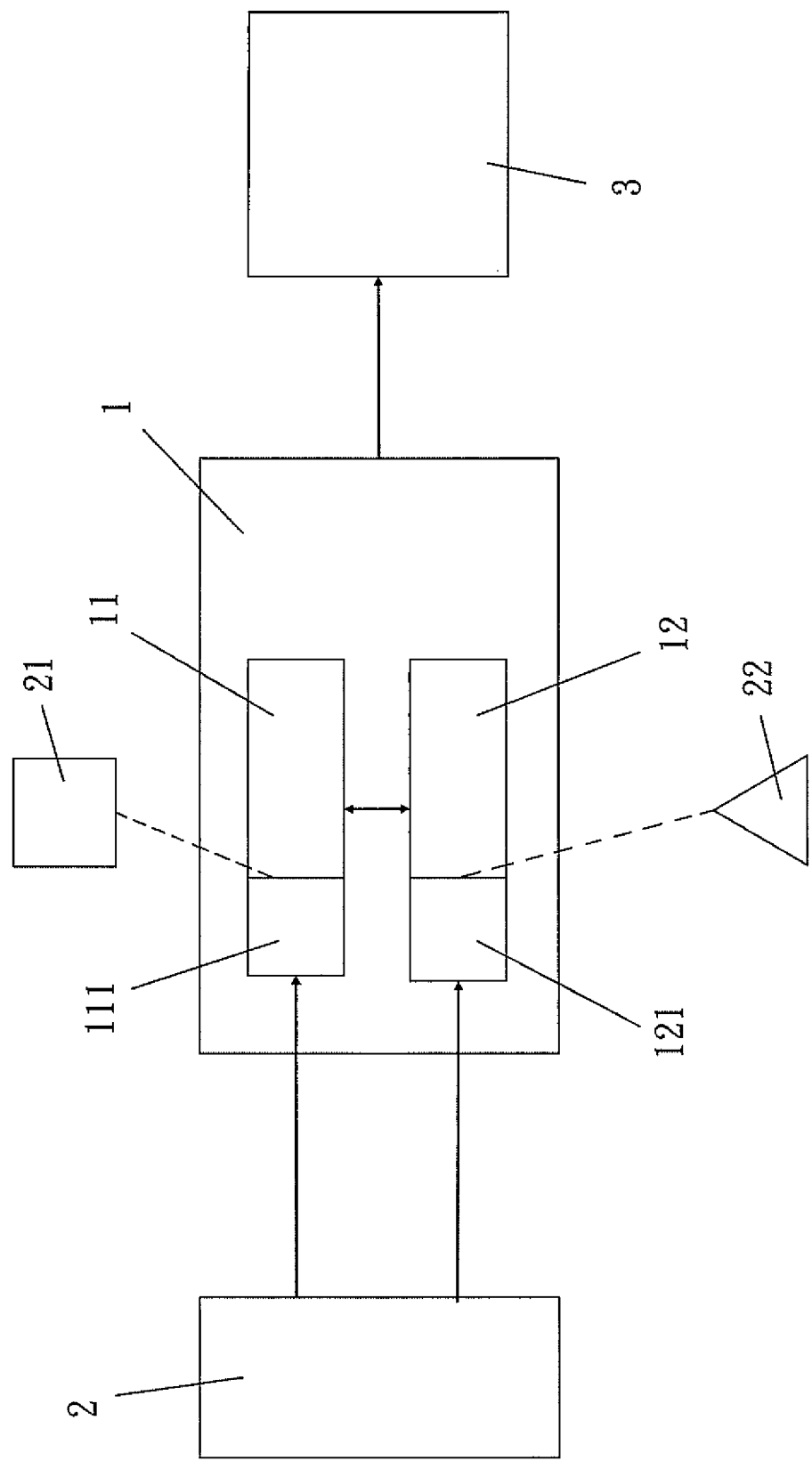
FIG. 1 is a schematic diagram of the combination of two intelligent single-chips and the communication judgment between them according to the present invention.

The present invention relates to a smart chip assembly 1 capable of communicating with each other and variable array in packaging. First, as shown in FIG. 1, combining two intelligent single-chips 11 and 12 as an example, when the smart single chip assembly 1 of the present invention is packaged, the two intelligent single-chips 11, 12 are packaged and cut in a parallel manner. As it can directly use the original pin to connect the application device on the connection pin, the two intelligent single-chips 11 and 12 can be combined into a single smart chip assembly 1. The two intelligent single-chips 11, 12 have camera lens modules 111, 121, respectively. When in use, the same external object 2 to be identified can be obtained through the shooting angle or depth of field of different lens modules to obtain two images 21, 22 of different angles or depth of field. The two images 21 and 22 can be independently processed by the intelligent single-chips 11 and 12 respectively, and the results can be judged by themselves. Or it can provide the result of the judgment as one of the options of the reference judgment, so that it can communicate with each other between the two intelligent single-chips 11 and 12, through its calculation and analysis, and then comprehensive judgment to get the best interpretation. Finally, based on the final interpret the results, the single smart chip assembly 1 then send the instructions to the connected power mechanism 3 to perform corresponding actions to achieve more accurate identification.

Figure 2B:
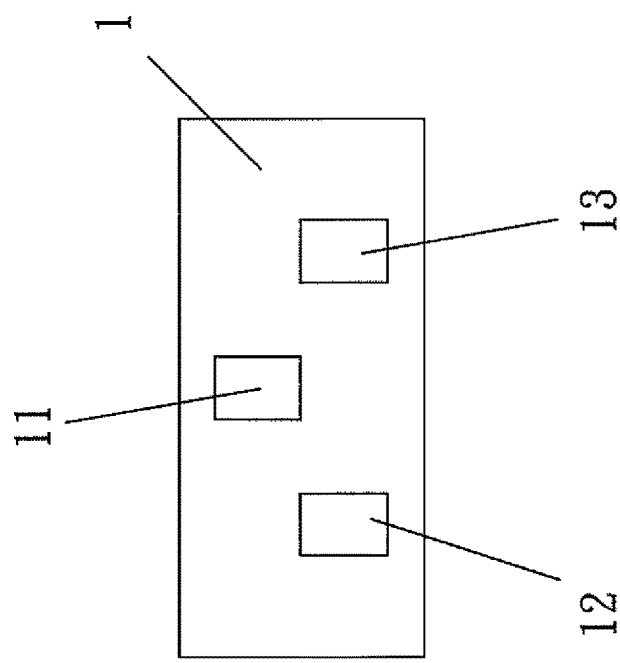
FIGS. 2A and 2B are two schematic diagrams of the combination of three intelligent single-chips of the present invention.
Figure 2A:
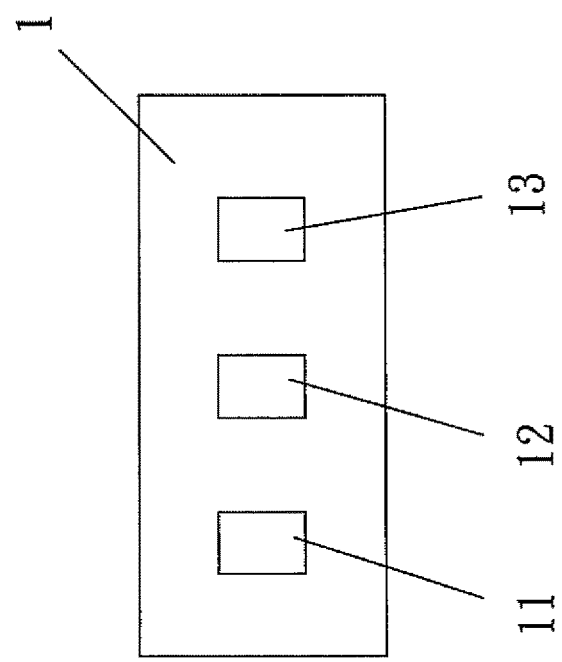
Figure 3B:
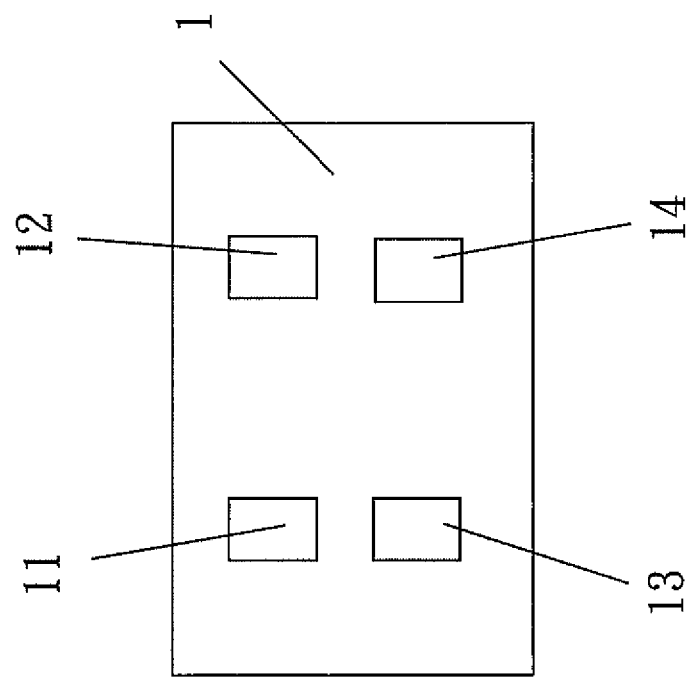
FIGS. 3A and 3B are two schematic diagram of the combination of four intelligent single-chips of the present invention.
Figure 3A:
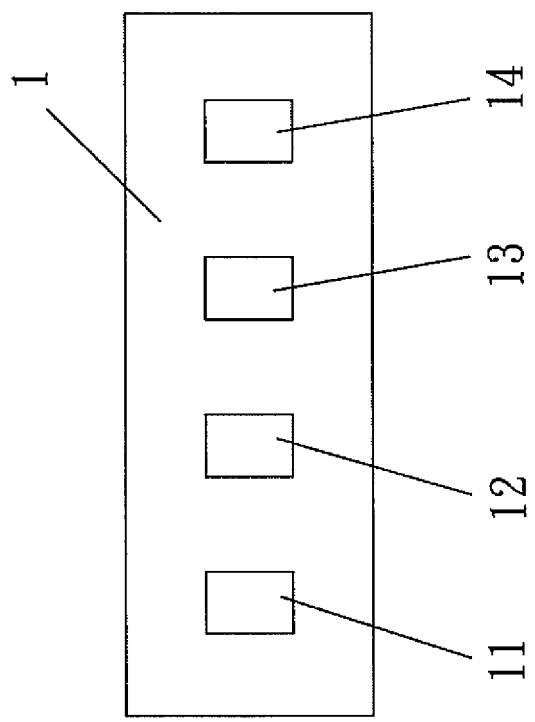

In another embodiment, the present invention can be used to combine three intelligent single-chips 11, 12, 13 into a smart chip assembly 1. The arrangement of the intelligent single-chips can be arranged in a single row, as shown in FIG. 2A, or in triangular shape, as shown in FIG. 2B. This invention can also be applied to the combination of four intelligent single-chips 11, 12, 13, and 14, which can be arranged in a single row, as shown in FIG. 3A, or arranged side by side, as shown in FIG. 3B. In actual use, depending on the needs, more intelligent single-chips can be combined as a smart chip assembly 1 to achieve the effect of variable arrangement chip packaging. In addition, for the above-mentioned intelligent chip combinations with different numbers or arrangements, during wafer manufacturing, various predetermined arrangements and combinations can be set and packaged together, so it is convenient to cut according to the arranged position and quickly obtain the chip assembly of multiple independent intelligent chips with a specific number or arrangement of this invention.

The characteristic of this invention is to combining at least two intelligent single-chips as a smart chip assembly, and the arrangement of each intelligent single-chip can be changed according to needs. Each intelligent single-chip has a camera lens module to obtain images of different angles or depths of field of the object to be identified. In addition to self-judgment, it can also communicate with each other between intelligent single-chips, calculate and analyze, and make comprehensive judgments to get the best interpretation. Finally, send instructions to the connected power mechanism to perform corresponding actions to improve the accuracy of identification. However, this operation does not need to be connected by an external transmission line or wireless transmission method, and has direct and effective communication, and can provide more applications in more fields, which has significant progress.

What is claimed is:

1. A smart chip assembly, comprising:

a package containing at least three intelligent single-chip modules interconnected in an array of a predetermined format and cut to complete an integrated structure, wherein each of said at least three intelligent single-chip modules is installed with a camera lens module, wherein said camera lens module of each of said at least three intelligent single-chip modules obtains images of an object of interest at different angles or depths of field, wherein said at least three intelligent single-chip modules communicate therebetween to calculate and analyze images and image dynamics acquired by said camera lens module of each of said at least three intelligent single-chip modules to obtain a resulting identification of said object of interest, said package being configured to transmit said resulting identification as a command to a connected power mechanism to perform corresponding actions, wherein said predetermined format of said array of said at least three intelligent single-chip modules is selected from a group consisting of: three of said intelligent single-chip modules arranged in a single row, three of said intelligent single-chip modules arranged in two rows in a zig-zag fashion, four of said single-chip modules arranged side-by-side in a single row, and four of said single-chip modules arranged in two rows and two columns fashion.

2. The smart chip assembly capable of communicating with each other and variable array in packaging as in claim 1, further comprising a plurality of smart chip assemblies fabricated on a wafer, wherein during said wafer manufacturing, a plurality of said arrays of intelligent single-chip modules are arranged side by side and packaged together, and said wafer is cut to separate said plurality of smart chip assemblies on the wafer into independent smart chip assemblies.

* * * * *